P. Beckman,
Snap Hook,
Nº 40,152.           Patented Oct. 6, 1863.

Witnesses:
H. W. Coombs
Geo. W. Reed

Inventor:
P. Beckman,
By Munn & Co
Attys

UNITED STATES PATENT OFFICE.

PHILIP BECKMAN, OF NAPERVILLE, ILLINOIS.

IMPROVED HARNESS-SNAP.

Specification forming part of Letters Patent No. 40,152, dated October 6, 1863.

*To all whom it may concern:*

Be it known that I, PHILIP BECKMAN, of Naperville, in the county of Du Page and State of Illinois, have invented a new and useful Improvement in Harness-Snaps; and I do hereby declare that the following is a full, clear, and exact description of the same, reference being had to the accompanying drawings, in which—

Figure 1:
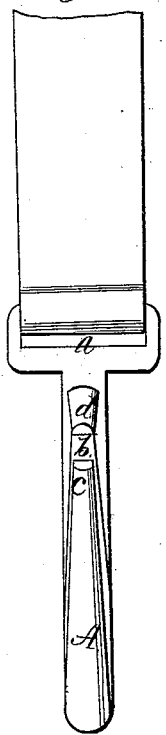
Figure 2:
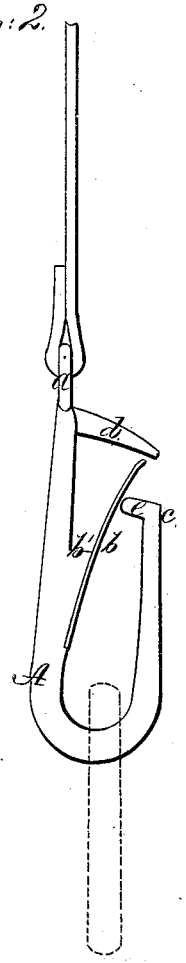

Figure 1 is a front elevation of my invention. Fig. 2 is a side elevation of the same.

Similar letters of reference in both views indicate corresponding parts.

This invention consists in securing the spring to the shank of a snap hook in a reverse position, its butt end being fastened to the shank near to the bend, and its loose end extending beyond the point of the hook close to a guard rising from the shank and under a lip or stop projecting from said point toward the spring in such a manner that a strain on the ring retained by the snap is sufficient to release the same without the necessity of depressing the spring with one hand and releasing the ring with the other; and, furthermore, when the ring is in the hook, it is securely retained by the combined action of the stop and spring, and the spring is not liable to be subjected to an undue strain and to break or get deranged.

To enable those skilled in the art to make and use my invention, I will proceed to describe it.

A represents a hook, made of iron or any other suitable material, and provided with a loop, *a*, to which a belt or strap can be secured. To the shank of said hook a spring, *b*, is riveted, and in order to give to the spring sufficient play, and at the same time preserve the necessary strength, said shank is provided with a shoulder, *b'*, as clearly shown in Fig. 2 of the drawings. The spring is secured to the shank in a reverse direction, its butt end being near to the bend of the hook, and its loose end extending beyond the point *c* and close to a guard, *d*, which rises from the shank close behind the ring or loop *a*. From the point *c* of the hook a lip or stop, *e*, projects in a direction toward the spring *b*, and said spring is so adjusted that it bears close against the edge of this lip or stop.

In order to enter a harness-ring into the hook, the same is placed between the guard *d* and the point of the hook, and by a slight pressure the spring is depressed and the ring slips under the lip *e* into the hook. As soon as the ring has passed into the hook, the spring resumes its original position, and by the combined action of said spring and of the lip or stop *e*, the ring is prevented from coming out spontaneously. If from some cause it should move toward the point of the hook, it is thrown against the stop by the action of the spring, and prevented from getting disengaged. In order to release the ring it is not necessary, as it is in ordinary snaps, to depress the spring with one hand and take the ring out with the other. By moving the ring toward the point of the hook and depressing it slightly, it can be disengaged with one hand with the greatest facility. In winter time it is not even necessary to take off the mittens to accomplish this object.

In short, my hook is cheap and simple in its construction, it is not liable to get out of order, it is easily operated, and the spring is perfectly protected and not liable to catch and break.

What I claim as new, and desire to secure by Letters Patent, is—

A snap having the spring *b* applied to its shank in a reverse direction, and provided with a guard, *d*, and stop *e*, to operate in combination with said spring, substantially as and for the purpose shown and described.

PHILIP BECKMAN.

Witnesses:
 MARTIN WARD,
 GEORG STRUBLER.